July 10, 1934.     R. T. ROYE     1,966,264
PUMP VALVE
Filed Aug. 29, 1932

Richard T. Roye Inventor

By Jesse R. Stone
& Lester B. Clark
Attorneys

UNITED STATES PATENT OFFICE 1,966,264

PUMP VALVE

Richard T. Roye, Houston, Tex., assignor to Gray Tool Co., Houston, Tex., a corporation Application August 29, 1932, Serial No. 630,762

3 Claims. (Cl. 251—144)

The invention relates to pump valves to be used particularly in heavy duty pumps for handling slush and the like and is particularly adapted for use in pumps employed in deep well operations.

It is an object of the invention to provide a valve wherein the movable valve member is constructed of one integral piece whereby it may be made cheaply and of strong construction.

It is another object of the invention to provide a valve ring into which the valve member may seat upon which a particularly effective form of seating surface is employed.

I contemplate the forming of a compressible packing member in the valve seat which is held in place by a removable metal ring which forms a portion of the seat and which may be held in place by a driving fit within the valve ring.

I contemplate the provision of a hardened steel ring which serves the double purpose of holding in position the packing gasket and of also forming a portion of the seat itself to take up the shock of the closing of the valve.

Figure 1:
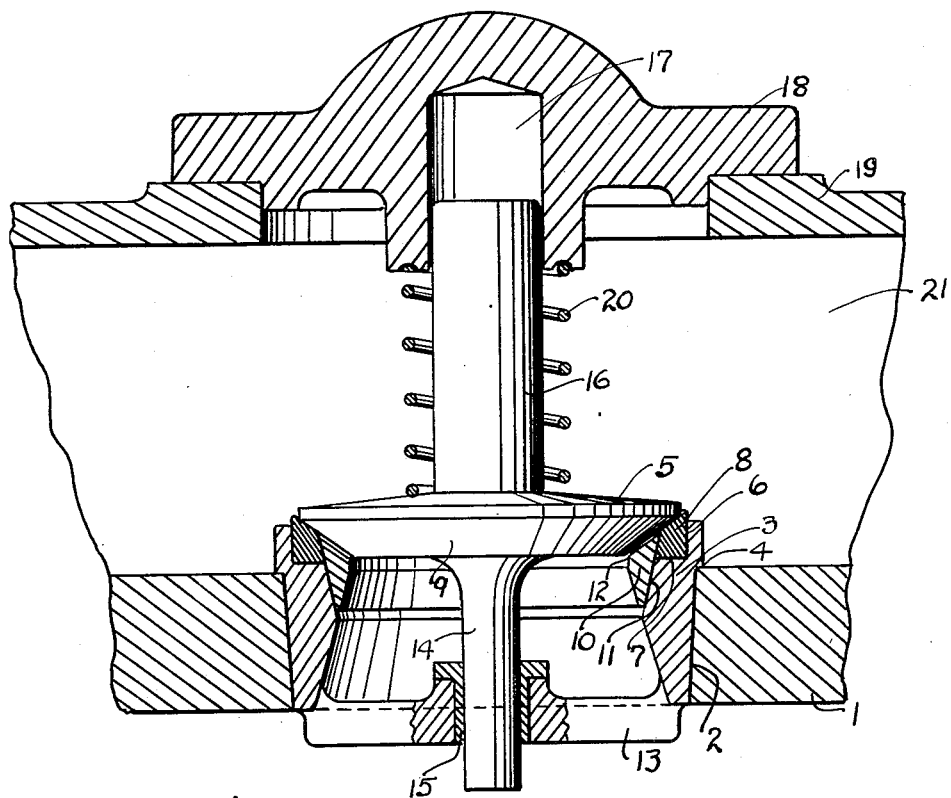

In the drawing herewith, Fig. 1 is a side elevation of my valve shown in position in the seat, said seat and the walls of the pump being shown in vertical section.

Figure 2:
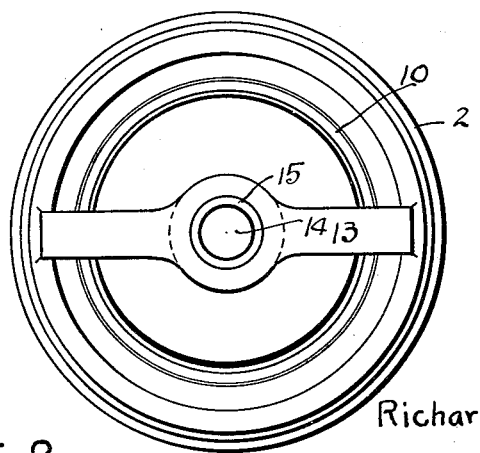

Fig. 2 is a bottom plan view of the valve.

My valve is adapted to be employed in connection with the usual horizontal reciprocating pump such as is employed in handling slush in well drilling. It is adapted, however, for use in all types of pumps of this general character. In the drawing the valve is shown as closing an opening through a wall 1 of the pump, said opening being indicated at 2.

The valve consists of the seat ring 3, which is formed to engage with a driving fit in the opening 2. For this purpose the ring is tapered slightly in a downward direction and has a shoulder at 4 engaging on the upper portion of the wall 1.

The upper portion of the ring is formed into a seat for the valve member 5, the seat being formed by recessing the annular groove 6 in the upper end of the ring. This recess has a lower shoulder 7 upon which a compressible packing ring 8 may seat. The upper face of the ring 8 is flared outwardly to form a fit with the downwardly tapered end 9 of the valve.

The inner face of the compressible ring is inclined inwardly and downwardly to interfit with a ring 10 of hardened steel. This ring is tapered downwardly on its outer face and has a driving fit within the tapered inner face 11 of the seat ring 3. It is driven downwardly in the outer ring and is made of resilient metal which will conform exactly to the seat due to the force with which it is driven down into the ring. The upper surface of the ring 10 is tapered at 12 to receive the valve 5.

It will be noted that the compressible gasket ring 8 extends above the seat ring 3 and also slightly above the locking ring 10. The locking ring engages against the gasket ring 8 to hold it rigidly in position.

At the lower end of the seat ring 3 is a transversely extending spider 13 having a guide opening therein to receive the downwardly extending valve stem 14. I have shown a removable bushing or thimble 15, within the guide opening, within which the stem is adapted to reciprocate. This bushing may be replaced when worn.

The valve member 5 is formed integral with the downwardly extending stem 14 and an upwardly extending stem 16 is also formed thereon to guide the upper portion of the valve. This stem 16 extends into a guide opening 17 in the removable cap 18 on the upper wall 19 of the pump chamber. A spring 20 is placed between the upper plate 18 and the valve plate 5, which tends to hold the valve resiliently downwardly into its seat.

In the operation of this valve the suction of the pump piston exerted in the chamber 21 will raise the valve from its seat to allow the entrance of fluid to said chamber. On the reverse stroke the valve will close and the lower tapered face 9 thereof will contact with the gasket ring 8, compressing it somewhat, and bringing the valve into contact with the upper surface of the locking ring 10. This locking ring serves to withstand the shock of the closing of the valve and assists also in the formation of a seal to prevent leakage around the valve member.

The advantage of this construction lies in the simplicity of the assembled valve. The gasket 8 may be locked in place by driving the ring 10 into position, the ring 10 then forming a portion of the seat. When the valve is to be removed or the gasket 8 replaced the ring 10 only need be driven from its seat in order to remove the gasket, and, after substituting another, replacing the ring 10, or, if the ring 10 is also worn, a new locking ring may be inserted. It will not be necessary to remove the entire seat member 3. It is easily and conveniently assembled and can be renewed with very little difficulty and expense.

What I claim as new is:
1. A pump valve including a disc-shaped valve tapered downwardly on its outer periphery, a seat ring having an annular recess in its upper end, a packing ring in said recess, said seat ring having a downwardly tapered seat below said recess, and a locking ring adapted to be driven into said seat and to hold said packing ring in position projecting above said seat ring to engage said valve, said locking ring having a downwardly and inwardly beveled seat to contact with said valve when said packing ring is compressed by said valve.

2. A pump valve including a disc-shaped valve tapered downwardly on its outer periphery, a seat ring having an annular recess in its upper end, a packing ring in said recess, said seat ring having a downwardly tapered seat below said recess, and a locking ring adapted to be driven into said seat and to hold said packing ring in position projecting above said seat ring to engage said valve, said locking ring being of hardened steel and shaped to receive said valve and support the same.

3. A valve seat including a seat ring, an annular packing gasket fitting in a recess in said seat ring, the inner faces of said ring and gasket being inclined inwardly and downwardly, and a locking ring having a driving fit with said seat ring and adapted to engage over the lower end of said gasket and secure it in position, the upper end of said locking ring being formed into a seat inside said gasket ring.

RICHARD T. ROYE.